US007786843B2

(12) United States Patent
Witkowski

(10) Patent No.: US 7,786,843 B2
(45) Date of Patent: Aug. 31, 2010

(54) SYSTEM AND METHOD FOR TRAINING A TRAINABLE TRANSMITTER AND A REMOTE CONTROL SYSTEM RECEIVER

(75) Inventor: Todd R. Witkowski, Zeeland, MI (US)

(73) Assignee: Johnson Controls Technology Company, Holland, MI (US)

(*) Notice: Subject to any disclaimer, the term of this patent is extended or adjusted under 35 U.S.C. 154(b) by 530 days.

(21) Appl. No.: 11/109,475

(22) Filed: Apr. 19, 2005

(65) Prior Publication Data

US 2006/0232377 A1 Oct. 19, 2006

(51) Int. Cl.
*G05B 19/00* (2006.01)

(52) U.S. Cl. .................. 340/5.25; 340/825.69; 380/270

(58) Field of Classification Search ................ 340/5.22, 340/5.25, 5.26, 5.61, 5.64, 825

See application file for complete search history.

(56) References Cited

U.S. PATENT DOCUMENTS

| | | | | |
|---|---|---|---|---|
| 4,241,870 | A | 12/1980 | Marcus | |
| 4,247,850 | A | 1/1981 | Marcus | |
| 4,490,830 | A | 12/1984 | Kai et al. | |
| 5,475,366 | A * | 12/1995 | Van Lente et al. | 340/525 |
| 5,479,155 | A | 12/1995 | Zeinstra et al. | |
| 5,661,804 | A | 8/1997 | Dykema et al. | |
| 5,661,807 | A * | 8/1997 | Guski et al. | 713/159 |
| 5,751,224 | A | 5/1998 | Fitzgibbon | |
| 5,872,513 | A | 2/1999 | Fitzgibbon et al. | |
| 5,949,349 | A | 9/1999 | Farris et al. | |
| 5,969,637 | A | 10/1999 | Doppelt et al. | |
| 6,025,785 | A | 2/2000 | Farris et al. | |
| 6,081,203 | A | 6/2000 | Fitzgibbon | |
| 6,091,343 | A | 7/2000 | Dykema et al. | |
| 6,154,544 | A | 11/2000 | Farris et al. | |
| 6,188,326 | B1 | 2/2001 | Flick | |
| 6,480,117 | B1 | 11/2002 | Flick | |
| 6,703,941 | B1 | 3/2004 | Blaker | |
| 2002/0034303 | A1 | 3/2002 | Farris et al. | |
| 2003/0033540 | A1 | 2/2003 | Fitzgibbon | |
| 2005/0026604 | A1 | 2/2005 | Christenson et al. | |

FOREIGN PATENT DOCUMENTS

WO WO 2006/113603 A2 10/2006

OTHER PUBLICATIONS

PCT International Search Report based on International Application No. PCT/US2006/014369, date of mailing of the International Search Report Dec. 4, 2006 (3 pgs.).

European Office Action for Patent Application No. 06750418.3, dated Jun. 17, 2009, 6 pages.

Written Opinion for International Application No. PCT/US2006/014369, mailed Oct. 19, 2007, 6 pages.

* cited by examiner

*Primary Examiner*—Brian A Zimmerman
*Assistant Examiner*—Nabil H Syed
(74) *Attorney, Agent, or Firm*—Foley & Lardner LLP

(57) ABSTRACT

A method for training a receiver of a remote control system to a trainable transmitter includes receiving a control signal from an original transmitter associated with the remote control system. A first period of time is started in response to receipt of the control signal. During the first period of time, a learn message is received from a trainable transmitter. In response to the learn message, the receiver begins a receiver training mode. During the training mode, a rolling code control signal is received from the trainable transmitter and the trainable transmitter is enrolled by storing an identifier of the trainable transmitter.

31 Claims, 4 Drawing Sheets

SYSTEM AND METHOD FOR TRAINING A TRAINABLE TRANSMITTER AND A REMOTE CONTROL SYSTEM RECEIVER

FIELD OF THE INVENTION

The present invention relates generally to the field of trainable transmitters or transceivers for use with vehicles. More specifically, the present invention relates to trainable transmitters that are configured for use with remote control systems.

BACKGROUND OF THE INVENTION

Electronically operated remote control systems, such as garage door opener systems, home security systems, home lighting systems, gate controllers, etc., typically employ a portable, hand-held transmitter (i.e., an original transmitter) to transmit a control signal to a receiver located at the remote control system. For example, a garage door opener system typically includes a receiver located within a home owner's garage and coupled to the garage door opener. A user presses a button on the original transmitter to transmit a radio frequency signal to the receiver to activate the garage door opener to open and close a garage door. Accordingly, the receiver is tuned to the frequency of its associated original transmitter and demodulates a predetermined code programmed into both the original transmitter and the receiver for operating the garage door. To enhance security of wireless control systems, such as a garage door opener system, manufacturers commonly use encryption technology to encrypt the radio frequency signal sent from a transmitter to a receiver. One such encryption method is a rolling code system, wherein each digital message sent from the transmitter to the receiver has a different code from the previous digital message.

As an alternative to a portable, hand-held original transmitter, a trainable transmitter or transceiver may be provided in a vehicle for use with remote control systems. A trainable transmitter is configurable by a user to activate one or more of a plurality of different remote control system receivers using different radio frequency messages. Typically, training a trainable transmitter to an existing original transmitter is a two-step process. First, a user holds the two transmitters in close range and presses buttons on the original transmitter and the trainable transmitter. The trainable transmitter identifies the type of remote control system associated with the original transmitter based on a radio frequency signal received from the original transmitter. For example, the trainable transmitter may identify and store the control code and RF carrier frequency of the original transmitter radio frequency control signal. Second, the receiver may learn a transmitter identifier of the trainable transmitter. For systems employing a rolling code (or other encryption method), the trainable transceiver and receiver must also be "synchronized" so that the counters of the trainable transmitter and the receiver begin at the same value. Accordingly, the user presses a button on the receiver to put the receiver in a training mode. A button on the trainable transceiver may then be pressed, for example, two to three times, within a set period of time to transmit messages so the receiver may learn the transmitter identifier, complete synchronization of the receiver and the trainable transmitter and confirm that training was successful. Once trained, the trainable transmitter may be used to transmit RF signals to control the remote control system.

As mentioned, the second step of the training process requires a user to put the receiver of the remote control system in a training mode. Accordingly, the user may need to climb a ladder to press a button on the remote control system receiver and then return to a vehicle to press a button of the trainable transmitter within a set period of time. A user may also not know that their remote control system (e.g., a garage door opener system) is a rolling code system and therefore requires the second step of the training process. Accordingly, the user may not perform the second step and the trainable transmitter will not operate the remote control system.

SUMMARY OF THE INVENTION

In accordance with an embodiment, a method for training a receiver of a remote control system to a trainable transmitter includes receiving a control signal from an original transmitter associated with the remote control system, starting a first period of time in response to receipt of the control signal, receiving a learn message from a trainable transmitter during the first period of time, beginning a receiver training mode in response to the learn message, receiving a rolling code control signal from the trainable transmitter during the training mode, and storing an identifier of the trainable transmitter.

In accordance with another embodiment, a method for training a trainable transmitter includes receiving a request to enter a training mode from a user, beginning a training mode in response to the request to enter a training mode, receiving a control signal from an original transmitter associated with a remote control system, detecting a frequency and control data of the control signal, the control data including a fixed portion and an encrypted portion, identifying rolling code data associated with the remote control system, generating a learn message based on the fixed portion and encrypted portion of the control signal, the learn message configured to cause a receiver of the remote control system to enter a training mode, receiving a request to transmit the learn message from a user, transmitting the learn message to the remote control system for a predetermined period of time, generating a rolling code control signal using the identified rolling code data upon expiration of the predetermined period of time, and transmitting the rolling code control signal to the remote control system.

In accordance with another embodiment, a trainable transmitter includes a user input device, a receiver circuit configured to receive signals, a transmitter circuit configured to transmit signals and a control circuit coupled to the user input device, the receiver circuit and the transmitter circuit, the control circuit having a training mode and configured to receive a control signal having a fixed portion and an encrypted portion from an original transmitter associated with a remote control system via the receiver circuit, to identify rolling code data associated with the remote control system based on the control signal, to generate a learn message based on the fixed portion and encrypted portion of the control signal, to transmit the learn message to the remote control system for a predetermined period of time via the transmitter circuit, to generate a rolling code control signal using the rolling code data upon expiration of the predetermined period of time and to transmit the rolling code control signal to the remote control system via the transmitter circuit. The learn message is configured to cause a receiver of the remote control system to enter a training mode.

DETAILED DESCRIPTION OF THE PREFERRED EMBODIMENTS

Figure 1:
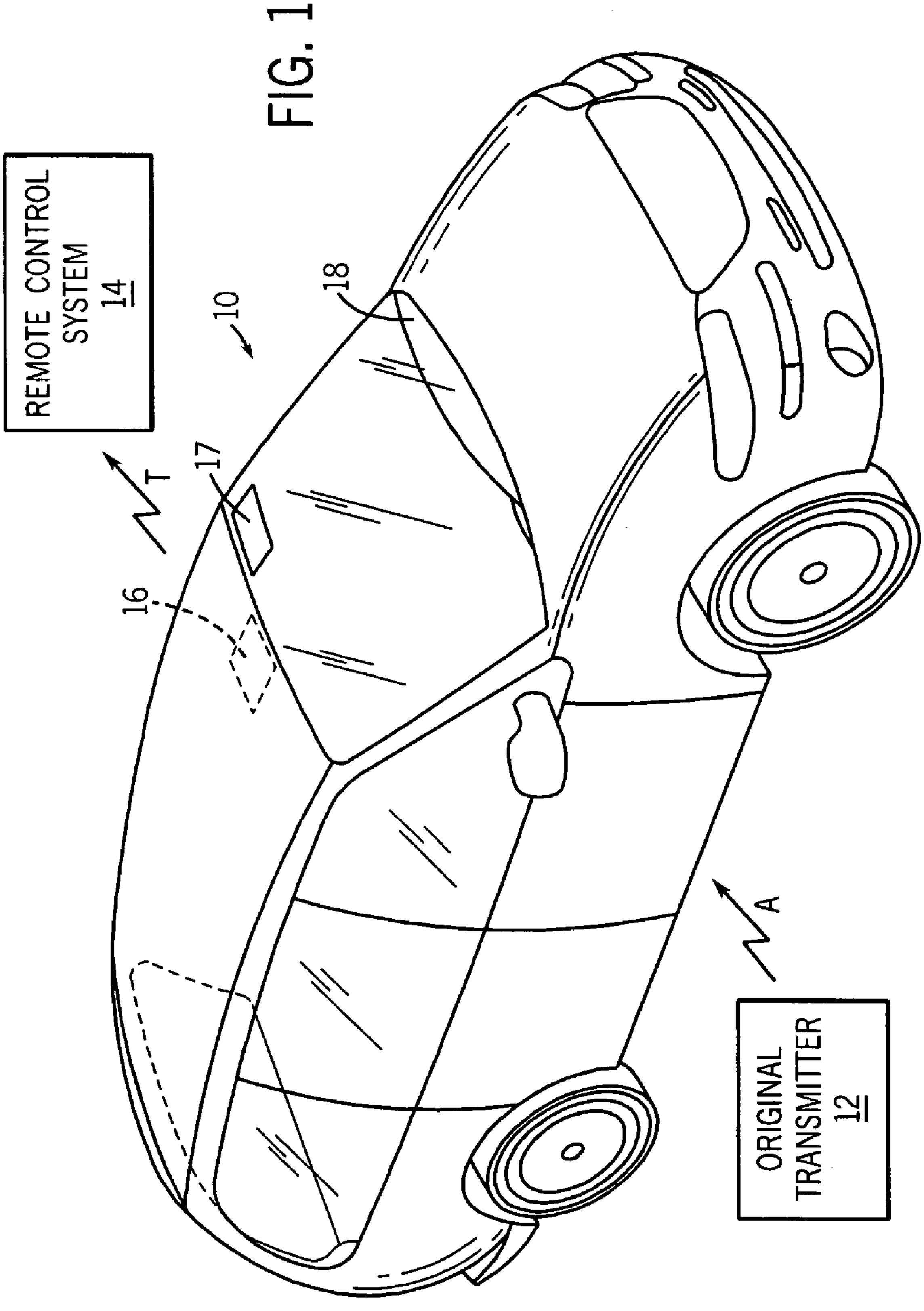
FIG. 1 is a perspective view of a vehicle having a trainable transmitter in accordance with an embodiment.

FIG. 1 is a perspective view of a vehicle including a trainable transmitter in accordance with an embodiment. A vehicle 10, which may be an automobile, truck, sport utility vehicle (SUV), mini-van, or other vehicle, includes a trainable transmitter 16. In alternative embodiments, a trainable transmitter may be embodied in other systems such as a portable housing, key fob, key chain or other hand-held device. In FIG. 1, trainable transmitter 16 is illustrated mounted to an overhead console of vehicle 10. Alternatively, one or more of the elements of trainable transmitter 16 may be mounted to other vehicle interior elements such as a visor 17, an instrument panel 18, a rearview mirror (not shown), a dashboard, seat, center console, door panel, or other appropriate location in the vehicle.

Trainable transmitter 16 may be configured to control a remote control system 14, such as a garage door opener, home security system, home lighting system, gate controller, etc. Trainable transmitter 16 is trained using an original transmitter 12 used to control remote control system 14. Original transmitter 12 is a transmitter, typically a hand-held transmitter, which is sold with remote control system 14 or as an after-market item, and which is configured to transmit an activation signal at a predetermined carrier frequency and having control data configured to actuate remote control system 14. For example, original transmitter 12 can be a hand-held garage door opener transmitter configured to transmit a garage door opener signal at a frequency, such as 355 Megahertz (MHz), wherein the activation signal has control data, which can be fixed code or cryptographically-encoded code (e.g., a rolling code). In this example, remote control system 14 may be a garage door opener system configured to open a garage door in response to receiving the activation signal from original transmitter 12. Accordingly, remote control system 14 includes an antenna (not shown) for receiving wireless signals including control data which would control remote control system 14.

To train trainable transmitter 16, an activation or control signal A is transmitted from original transmitter 12 to trainable transmitter 16 in the vehicle 10. Trainable transmitter 16 receives the control signal, identifies the control data (e.g., fixed or rolling code data) and carrier frequency of the control signal and stores this information. Trainable transmitter 16 may then be used to selectively generate a control signal T based on the learned frequency and control data and to transmit the control signal T to the remote control system 14, such as a garage door opener, that is responsive to the control signal. The training and operation of trainable transmitter 16 is discussed in further detail below.

Figure 2:
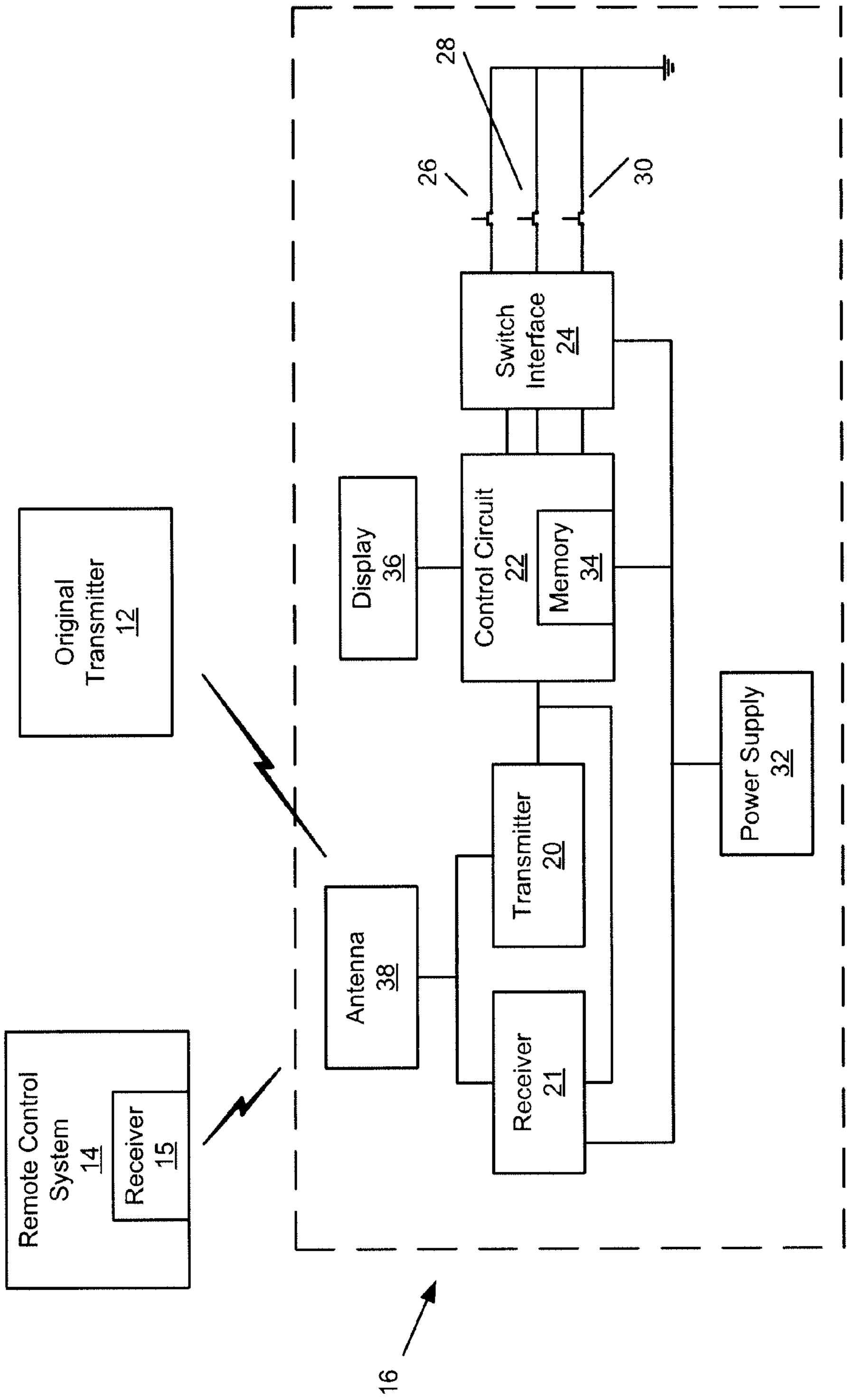
FIG. 2 is a schematic block diagram of a trainable transmitter in accordance with an embodiment.

FIG. 2 is a schematic block diagram of a trainable transmitter in accordance with an embodiment. Transmitter 16 includes a transmitter circuit 20 and a receiver 21 that are coupled to an antenna 38. In another embodiment, a single dual function transceiver having transmit and receive circuitry may be provided in place of a separate receiver and transmitter. Transmitter circuit 20 and receiver 21 are also coupled to a control circuit 22. Control circuit 22 may include various types of control circuitry, digital and/or analog, and may include a microprocessor, microcontroller, application specific integrated circuit (ASIC), or other digital and/or analog circuitry configured to perform various input/output, control, analysis, and other functions to be described herein. A switch interface 24 is coupled to a plurality of buttons or switches. Alternatively, other user input devices such as knobs, dials, etc., or a voice actuated input control circuit configured to receive voice signals from a vehicle occupant may be provided to receive user input. In an exemplary embodiment, switch interface 24 is coupled to one terminal of each of three push button switches 26, 28 and 30, which have their remaining terminal connected to ground. Switches 26, 28 and 30 may each be associated with a separate remote control system to be controlled, each of which may have its own unique operating RF frequency, modulation scheme, and/or control data. Thus, switches 26, 28 and 30 each correspond to a different radio frequency channel for transmitter circuit 20. It should be understood, however, that each channel may be trained to the same original transmitter, if desired, or to different original transmitters.

Interface circuit 24 couples signal information from switches 26, 28 and 30 to the input terminals of control circuit 22. Control circuit 22 includes data input terminals for receiving signals from the switch interface 24 indicative of the closure states of switches 26, 28 and 30. A power supply 32 is conventionally coupled to the various components for supplying the necessary operating power in a conventional manner.

Control circuit 22 is also coupled to a display 36 which includes a display element such as a light emitting diode (LED). Display 36 may alternatively include, for example, a liquid crystal display (LCD), a vacuum fluorescent display (VFD), or other display elements. Control circuit 22 includes a memory 34 including volatile and/or non-volatile memory to, for example, store a computer program or other software to perform the functions described herein. Memory 34 is configured to store learned information such as control data and carrier frequency information that may be associated with switches 26, 28 and 30. In addition, for rolling code or other cryptographically encoded remote control systems, information regarding the rolling code or cryptographic algorithms for each system may be pre-stored and associated with frequencies and control data that may be used to identify a particular type of remote control system and, therefore, the appropriate cryptographic algorithm for the remote control system. As discussed previously, each switch or button 26, 28 and 30 may be associated with a separate remote control system, such as different garage door openers, electronically operated access gates, house lighting controls and other remote control systems, each which may have its own unique operating RF frequency, modulation scheme, encryption(or cryptographic) algorithm and control data.

Transmitter circuit 20 and receiver 21 communicate with the remote control system 14 and the original transmitter 12 via antenna 38. Receiver 21 may be used to receive signals via antenna 38 and transmitter circuit 20 may be used to transmit signals via antenna 38. In an alternative embodiment, a separate antenna may be used with transmitter 20 and with receiver 21 (e.g., separate transmit and receive antennas may be provided in the trainable transmitter). Remote control system 14 includes a receiver 15 to receive signals such as an RF control signal from, for example, original transmitter 12 or trainable transmitter 16. Once a channel of trainable transmitter 16 has been trained, trainable transmitter 16 is configured to transmit a wireless control signal having control data that will control remote control system 14. For example, in response to actuation of a switch such as switch 26, transmitter circuit 20 is configured, under control from control circuit 22, to generate a control signal having a carrier frequency and control data associated with the particular trained channel. The control data may be modulated onto the control signal using, for example, frequency shift key (FSK) modulation, amplitude shift key (ASK) modulation or other modulation technique. The control data on the control signal may be a rolling code or other cryptographically encoded control code suitable for use with remote control system 14. As mentioned previously, the rolling code or cryptographic algorithm for remote control system 14 may be identified by trainable transmitter 16 using the control signal (e.g., the carrier frequency and control data) of original transmitter 12.

Figure 3:
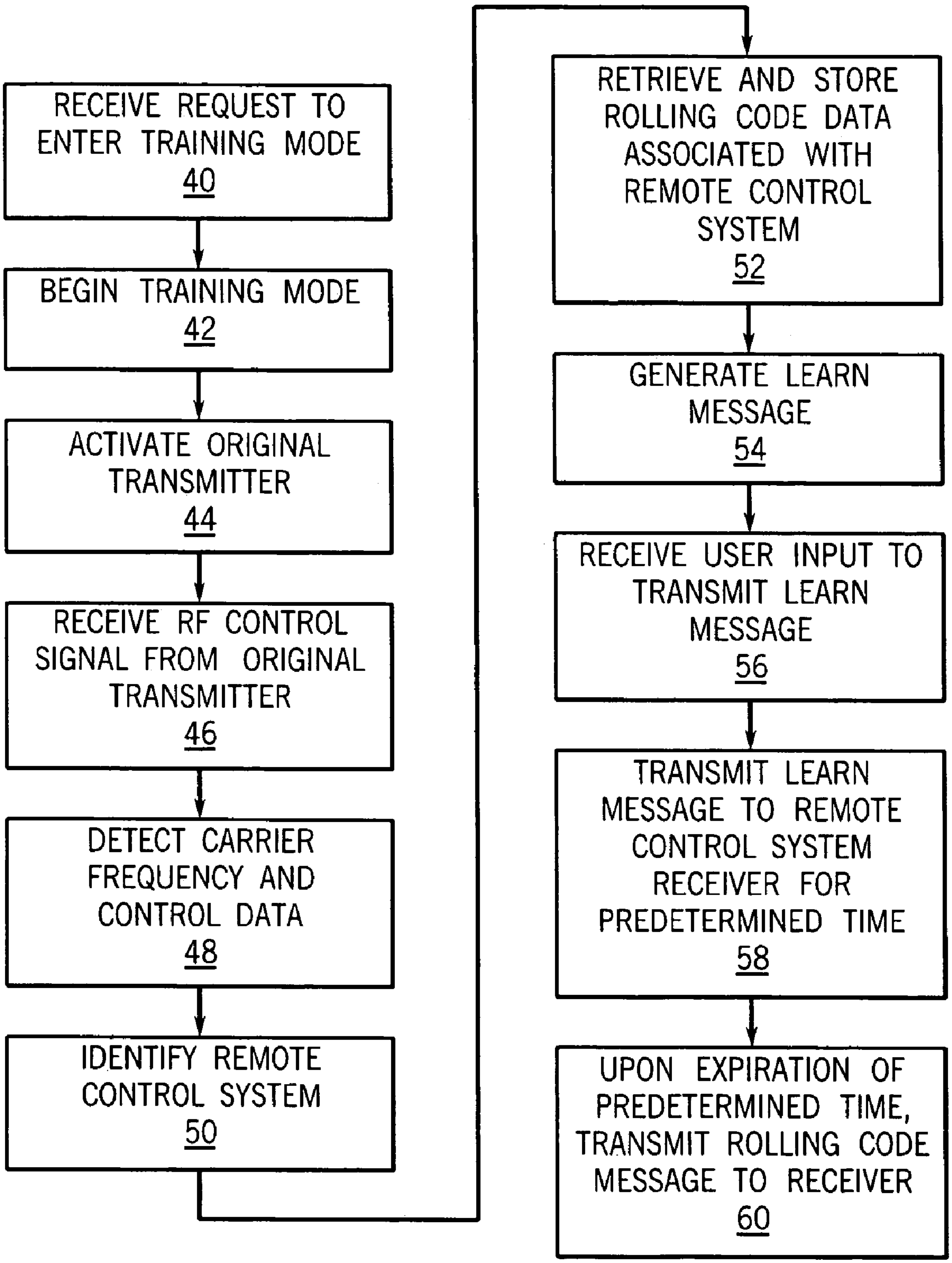
FIG. 3 illustrates a method of training a trainable transmitter in accordance with an embodiment.

FIG. 3 illustrates a method for training a trainable transmitter in accordance with an embodiment. Both the trainable transmitter and the original transmitter are brought within range of the remote control system (e.g., a garage door opener system). At block 40, a request to enter a training mode is received from a user at the trainable transmitter. For example, a user may provide a request by actuating a pushbutton (e.g., pushbutton 26 in FIG. 2) of the trainable transmitter. In one embodiment, the user holds the pushbutton until feedback is provided that the training of the channel is complete. Alternatively, the user may hold the pushbutton for a predetermined amount of time (e.g., 3 seconds, 10 seconds, etc.). A display may be used to indicate to the user that a training mode was initiated, for example, a display element such as an LED indicator may flash to provide feedback to a user. In addition, the display element may be used to indicate that the channel is trained (e.g., a LED may flash rapidly). In alternative embodiments, a request to enter a training mode may be provided by a combination of key presses using input devices of the trainable transmitter, by receiving a message on a vehicle bus, upon receipt of a control signal from the original transmitter or by selecting a menu item on a display.

Figure 4:
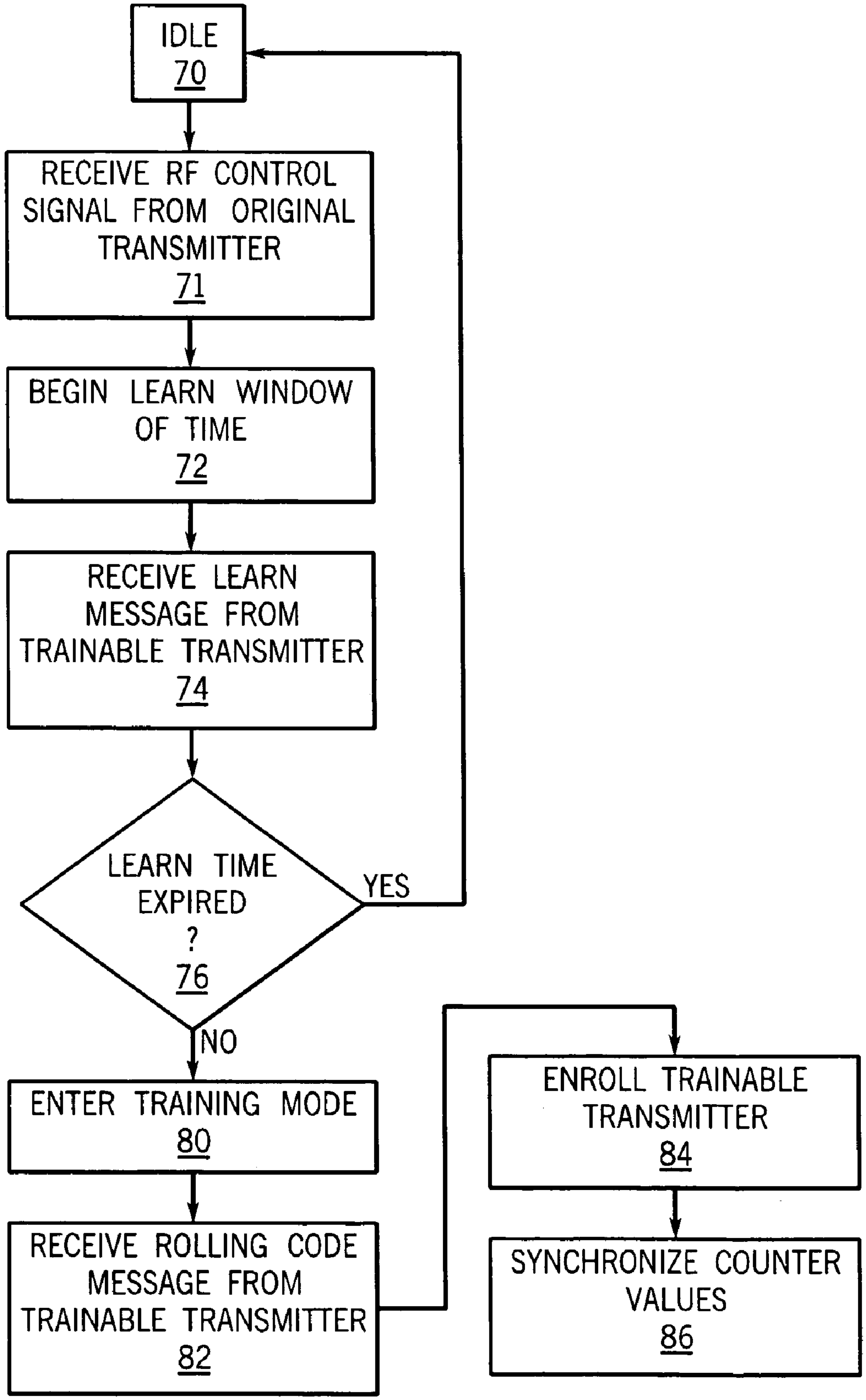
FIG. 4 illustrates a method of training a receiver of a remote control system in accordance with an embodiment.

At block 42, the trainable transmitter enters a training mode and begins looking for a control signal to train the channel. At block 44, an original transmitter for a remote control system (e.g., original transmitter 12 in FIG. 2) is brought within the vicinity of the trainable transmitter and activated (e.g., a user input device of the original transmitter is actuated) to send an RF control signal, for example, a control signal with a rolling code. At block 46, the trainable transmitter receives the RF control signal from the original transmitter. In addition, the remote control system which is also within range of the original transmitter, receives the RF control signal from the original transmitter at block 71 shown in FIG. 4. FIG. 4 illustrates a method for training a receiver of a remote control system in accordance with an embodiment. At block 72, the remote control system receiver (e.g., receiver 15 shown in FIG. 2) starts a window of time in which it will receive and accept a learn message from the trainable transmitter. In an exemplary embodiment, the window of time may be, for example, 30 to 45 seconds. In another embodiment, a remote control system, such as a garage door opener, may be configured to close the learn window before expiration of the time period if, for example, a photo beam at the bottom of the garage is broken. This may be an indication that a vehicle is entering or exiting the garage and that it is likely a user is not attempting to train a trainable transmitter.

Returning to FIG. 3, the trainable transmitter detects and identifies a carrier frequency and control data of the received RF control signal at block 48. For example, the trainable transmitter may receive the rolling code signal from the original transmitter, demodulate the control signal and identify the control data and carrier frequency of the control signal. The carrier frequency and control data may be stored in memory. The control data of the encrypted rolling code signal may include a transmitter identifier (e.g., a serial number) and an encrypted counter value (or a hop code). A counter value in the original transmitter increments each time the button is pressed and is encrypted using an encryption algorithm to generate the encrypted counter value of the control signal. At block 50, the carrier frequency and control data may be used to identify the type of remote control system (e.g., the manufacturer) associated with the original transmitter. Rolling code data (e.g., an encryption algorithm and carrier frequency or frequencies) may be retrieved from memory based on the type of remote control system and associated with the channel being trained at block 52. Once the training process is complete, this information may be used to generate appropriate control signals (e.g., an appropriate rolling code signal) in response to subsequent actuation of an input device of the trainable transmitter associated with the trained channel. At block 54, the trainable transmitter (e.g., a control circuit 22 of the trainable transmitter shown in FIG. 2) generates a learn message that is used to cause the remote control system receiver to enter a training mode. The learn message is generated based on at least the encrypted portion (e.g., the encrypted counter value) of the original transmitter control signal. The unencrypted portion (e.g., the transmitter identifier for the original transmitter) of the control signal may also be used to generate the learn message. In one embodiment, a transmitter identifier for the trainable transmitter (e.g., a serial number for the trainable transmitter) may be included in the learn message.

In an exemplary embodiment, the learn message is generated by applying a predetermined algorithm to the encrypted portion of the control signal in its encrypted form (e.g., an encrypted counter value that has not been decrypted) and the transmitter identifier (e.g., the fixed portion of the control signal) of the original transmitter. The learn message may, for example, represent an initial rolling count for the trainable transmitter. The learn message may also include the transmitter identifier (e.g., a serial number) of the trainable transmitter. In an alternative embodiment, the learn message may include a value generated by performing an exclusive-OR (XOR) or addition between the encrypted portion of the original transmitter control signal and the transmitter identifier of the trainable transmitter. It should be understood that other predetermined algorithms may be used to generate the learn message based on the original transmitter control signal (e.g., the fixed and encrypted portions of the original transmitter control signal) and are within the scope of the appended claims. For example, as discussed above, a predetermined algorithm may be applied to the transmitter identifier and the encrypted counter value (in its encrypted form) of the original transmitter control signal. In an exemplary embodiment, the learn message generated is a fixed message, for example, a 32-bit fixed word. In an alternative embodiment, the learn message may include a fixed portion and an encrypted portion (e.g., a portion of the learn message may be encrypted using an encryption algorithm).

At block 56, a user provides input (e.g., by actuating the pushbutton associated with the trained channel) to initiate transmission of the learn message to the remote control system receiver at block 58. Preferably, the learn message is transmitted for a predetermined period of time. In an exemplary embodiment, the learn message may be transmitted for one second or several seconds. In another embodiment, the trainable transmitter may be configured to transmit the learn message for the duration of time the user is holding the button down. Upon expiration of the predetermined period of time, the trainable transmitter generates a rolling code control signal using the rolling code data (e.g., an encryption algorithm and carrier frequency) associated with the trained channel and transmits the rolling code control signal to the remote control system at block 60.

Referring again to FIG. 4, at block 74, the remote control system receiver receives the learn message from the trainable transmitter. A receiver (e.g., receiver 15 show in FIG. 2) of the remote control system is configured to identify a learn message generated with the predetermined algorithm. If the window of time has expired at block 76, the remote control system receiver returns to an idle state 70 and waits for another transmission from an original transmitter. If the window of time triggered by receipt of the original transmitter control signal (described above) has not expired at block 76, the remote control systems receiver enters a training (or enrollment) mode in response to the learn message at block 80. At block 82, the remote control system receiver receives the rolling code control signal transmitted from the trainable transmitter. In response to the rolling code control signal, the receiver enrolls the trainable transmitter as a valid transmitter at block 84. For example, the receiver may store the serial number of the trainable transmitter and identify the trainable transmitter as a valid transmitter. In addition, the counter values of the trainable transmitter and the remote control system are synchronized at block 86.

While the exemplary embodiments illustrated in the FIGS. and described above are presently preferred, it should be understood that these embodiments are offered by way of example only. For example, alternative embodiments may be suitable for use in the commercial market, wherein office lights or security systems or parking garage doors are controlled. Accordingly, the present invention is not limited to a particular embodiment, but extends to various modifications that nevertheless fall within the scope of the appended claims. The order or sequence of any process or method steps may be varied or re-sequenced according to alternative embodiments.

What is claimed is:

1. A method for training a trainable transmitter to send authenticated control signals to a remote control system, the method comprising:

initiating a training mode;

receiving a first signal from an original transmitter associated with the remote control system;

identifying an encrypted portion of the first signal;

constructing a learn message including the encrypted portion of the first signal and an identifier associated with the trainable transmitter;

transmitting the learn message to the remote control system;

waiting a period of time before generating a second signal, wherein the second signal is configured to cause actuation of the remote control system; and transmitting the second signal to the remote control system;

wherein the learn message is configured to cause the remote control system to calculate information that the remote control system will expect to receive with the second signal, wherein the second signal includes the identifier associated with the trainable transmitter and a new encrypted portion.

2. The method of claim 1, wherein the information comprises an identifier the remote control system will use to identify the trainable transmitter.

3. The method of claim 1, wherein the second signal is generated based on at least one of a remote control system type, an encryption algorithm, and a carrier frequency.

4. The method of claim 1, wherein the first signal comprises a fixed portion including an identifier of the original transmitter and the first signal further comprises the encrypted portion that includes an encrypted counter value, and wherein the learn message is also constructed using the fixed portion.

5. The method of claim 1, further comprising:

receiving a request to enter the training mode, wherein the request to enter the training mode is received via a pushbutton.

6. The method of claim 1, wherein the trainable transmitter is integrated in a vehicle.

7. The method of claim 1, wherein the trainable transmitter is integrated in a vehicle interior element, wherein the vehicle interior element is a mirror.

8. A transceiver device for mounting in a vehicle and for communicating with a remote control system associated with an original transmitter, the transceiver device comprising:

a control circuit;

a receiver circuit communicably coupled to the control circuit and configured to receive a first signal from the original transmitter, wherein the control circuit is configured to identify an encrypted portion of the first signal, and wherein the control circuit is further configured to construct a learn message including the encrypted portion of the first signal and an identifier associated with the transceiver device; and a transmitter circuit communicably coupled to the control circuit and configured to transmit the learn message to the remote control system, wherein the control circuit is configured to generate a second signal, and wherein the transmitter circuit is configured to transmit the second signal to the remote control system, wherein the second signal is configured to cause actuation of the remote control system;

wherein the learn message is configured to cause the remote control system to calculate information that the remote control system will expect to receive with the second signal, wherein the second signal includes the identifier associated with the transceiver device and a new encrypted portion.

9. The transceiver device of claim 8, wherein at least one part of the transceiver device is mounted to a mirror of the vehicle.

10. The transceiver device of claim 8, wherein the transceiver device is mounted to a rearview mirror.

11. The transceiver device of claim 8, wherein the encrypted portion includes an encrypted counter value.

12. The transceiver device of claim 8, wherein the encrypted portion is not decrypted by the transceiver device.

13. The transceiver device of claim 8, wherein the first signal further includes an identifier of the original transmitter, and wherein the control circuit is further configured to construct the learn message using the identifier.

14. The transceiver device of claim 8, wherein the control circuit is configured to generate the second signal using data retrieved from memory, wherein the data retrieved from memory is determined by using at least one of the carrier frequency of the first signal and an identifier associated with the original transmitter.

15. The transceiver device of claim 8, wherein the control circuit is configured to generate the second signal so that it comprises the information that the remote control system should expect to receive with the second signal, the information comprising a rolling code message and an encryption algorithm.

16. A mirror for mounting in a vehicle, the mirror comprising:

a transceiver configured to:

initiate a training mode;

receive a first signal from an original transmitter associated with a remote control system;

identify an encrypted portion of the first signal;

construct a learn message including the encrypted portion of the first signal and an identifier associated with transceiver;

transmit the learn message to the remote control system;

waiting a period of time before generating a second signal, wherein the second signal is configured to cause actuation of the remote control system; and transmit the second signal to the remote control system;

wherein the learn message is configured to cause the remote control system to calculate information that the remote control system will expect to receive with the second signal, wherein the second signal includes the identifier associated with the transciever and a new encrypted portion.

17. The method of claim 1, wherein the second signal is configured to cause the remote control system to enroll the trainable transmitter as a valid transmitter.

18. The method of claim 1, wherein the learn message includes an identifier associated with the original transmitter.

19. The method of claim 1, wherein the learn message is configured to cause the receiver to enter a learn mode.

20. The method of claim 1, wherein constructing the learn message including the encrypted portion of the first signal and the identifier associated with the trainable transmitter comprises applying a predetermined algorithm to the encrypted portion of the first signal in its encrypted form.

21. The method of claim 20, wherein applying the predetermined algorithm includes performing an exclusive-OR (XOR) operation between the encrypted portion of the first signal and identifier associated with the trainable transmitter.

22. The method of claim 20, wherein applying the predetermined algorithm includes performing an addition operation between the encrypted portion of the first signal and identifier associated with the trainable transmitter.

23. The method of claim 4, wherein constructing the learn message including the encrypted portion of the first signal and the identifier associated with the trainable transmitter comprises applying a predetermined algorithm to the identifier associated with the trainable transmitter and the encrypted counter value of the first signal in its encrypted form.

24. The transceiver device of claim 8, wherein the control circuit configured to construct the learn message including the encrypted portion of the first signal and the identifier associated with the trainable transmitter is further configured to apply a predetermined algorithm to the encrypted portion of the first signal in its encrypted form.

25. The transceiver device of claim 24, wherein applying the predetermined algorithm includes performing an exclusive-OR (XOR) operation between the encrypted portion of the first signal and identifier associated with the trainable transmitter.

26. The transceiver device of claim 24, wherein applying the predetermined algorithm includes performing an addition operation between the encrypted portion of the first signal and identifier associated with the trainable transmitter.

27. The transceiver device of claim 8, wherein the first signal comprises a fixed portion including an identifier of the original transmitter and the first signal further comprises the encrypted portion that includes an encrypted counter value, and wherein the learn message is also constructed using the fixed portion, wherein the control circuit configured to construct the learn message including the encrypted portion of the first signal and the identifier associated with the trainable transmitter is further configured to apply a predetermined algorithm to the identifier associated with the trainable transmitter and the encrypted counter value of the first signal in its encrypted form.

28. The mirror of claim 16, wherein constructing a learn message including the encrypted portion of the first signal and an identifier associated with the transceiver comprises applying a predetermined algorithm to the encrypted portion of the first signal in its encrypted form.

29. The mirror of claim 28, wherein applying the predetermined algorithm includes performing an exclusive-OR (XOR) operation between the encrypted portion of the first signal and identifier associated with the transceiver.

30. The mirror of claim 28, wherein applying the predetermined algorithm includes performing an addition operation between the encrypted portion of the first signal and identifier associated with the transceiver.

31. The mirror of claim 16, wherein the first signal comprises a fixed portion including an identifier of the original transmitter and the first signal further comprises the encrypted portion that includes an encrypted counter value, and wherein the learn message is also constructed using the fixed portion, wherein constructing the learn message including the encrypted portion of the first signal and the identifier associated with the transceiver comprises applying a predetermined algorithm to the identifier associated with the transceiver and the encrypted counter value of the first signal in its encrypted form.

* * * * *